(12) United States Patent
Bertelsen et al.

(10) Patent No.: US 8,188,158 B2
(45) Date of Patent: May 29, 2012

(54) POLYMER BASED INK FORMULATION

(75) Inventors: Craig Michael Bertelsen, Union, KY (US); Yaqiang Ming, Lexington, KY (US); Rebecca Beth Silveston-Keith, Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 428 days.

(21) Appl. No.: 12/176,193

(22) Filed: Jul. 18, 2008

(65) Prior Publication Data

US 2010/0016469 A1 Jan. 21, 2010

(51) Int. Cl.
*C08K 3/04* (2006.01)
*C09D 11/10* (2006.01)

(52) U.S. Cl. .......... 523/122; 524/424; 524/602
(58) Field of Classification Search ............. 523/122; 524/424, 602
See application file for complete search history.

(56) References Cited

U.S. PATENT DOCUMENTS

| | | | | |
|---|---|---|---|---|
| 6,368,397 | B1* | 4/2002 | Ichizawa et al. | 106/31.65 |
| 2003/0029355 | A1* | 2/2003 | Miyabayashi | 106/31.27 |
| 2008/0233069 | A1* | 9/2008 | Tamareselvy et al. | 424/70.11 |

* cited by examiner

*Primary Examiner* — Kriellion Sanders

(57) ABSTRACT

The invention provides an ink formulation comprising a polymer associated self-dispersed colorant. The polymer has an alkyl amino end functional group that is chemically associated by electron donation/acceptation and hydrogen bonded to surface functional groups of the colorant particles. The modified self-dispersed colorant shows improved printing quality.

18 Claims, No Drawings

POLYMER BASED INK FORMULATION

BACKGROUND

1. Field of the Invention

The invention relates to ink formulations suitable for use in inkjet printers. More specifically, the invention relates to surface modified pigments for use in ink formulations.

2. Description of the Related Art

Inkjet printing is one of the widely used print methods in commercial products. Ink formulations used in inkjet printing include de-ionized water, a water-soluble organic solvent, and a colorant. The colorant may be a dye or a pigment. However, dyes have poor water-fastness, poor light-fastness, poor ozone stability, and poor thermal stability. This affects the print quality. Accordingly, pigments are used in many ink formulations because they provide better light-fastness, ozone resistance, humidity fastness, resistance to oxidation, and higher thermal stability.

However, pigments are insoluble in aqueous solutions and therefore various methods are employed to improve the dispersibility of the pigments. The methods employed to improve a pigment's dispersibility include surface oxidation and polymer dispersant milling. The surface oxidation method involves generating functional groups, such as carboxy, hydroxy, and sulfonyl, on the surface of the pigment particles. The pigments modified by the surface method are referred to as self-dispersed pigments. An example of a self-dispersed pigment is the surface modified carbon black or self-dispersed carbon black. The ink formulations made from self-dispersed pigments have good optical density but poor adhesion with respect to the print media specifically if they are applied to micro-porous paper. The poor adhesion to the print media results in susceptibility to image quality defects by abrasive forces applied perpendicular or parallel to the plane of the ink on the paper.

The polymer dispersant milling method uses polymeric dispersants that are adsorbed on to the surface of such pigments. The pigments modified by the polymer dispersant milling method are referred to as dispersed pigments. The ink formulations made from dispersed pigments have better resistance to abrasion and adhesion to the print media but poor optical density and slow drying rate specifically on plain paper and photo paper. Further, there may be lot of free polymeric dispersants dissolved in aqueous phase of the ink formulation, which may result in jetting issues such as flooding on or around the nozzle plate of the printhead.

Accordingly, there is a need for an ink formulation that provides good adhesion and optical density on print media especially on micro-porous photo papers. Further, the ink formulation should have good thermal stability.

SUMMARY OF THE INVENTION

This invention provides an ink formulation that has polymer associated surface modified colorants. The ink formulation comprises self-dispersed colorant particles associated with a polymer having an alkyl amino end functional group. The self-dispersed colorant particles have surface functional groups which provide a site for a reaction. The polymer interacts with the surface functional groups and is chemically grafted to the self-dispersed colorant particles. The alkyl amino end functional group reacts with the surface functional group by hydrogen bonding or salt formation. In an exemplary embodiment of the invention, the self-dispersed colorant is a surface modified carbon black with carboxy or hydroxy functional groups and the polymer is an acrylate polymer having a weight average molecular weight in the range of about 500 to about 8000. The preferred weight average molecular weight is 1000 to 2000. The polymer also has a sulfonic acid group, an alkoxy functional group and a hydroxy functional group. The ink formulation of the invention shows excellent adhesion and resistance to perpendicular or parallel abrasive forces on print media and has improved gloss over self dispersed inks, optical density and dry time without changing the viscosity of the ink formulation.

DETAILED DESCRIPTION

It is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The invention provides an ink formulation that includes polymer associated surface modified colorants. The ink formulation includes at least one colorant having surface functional groups and a polymer. The polymer has an alkyl amino end functional group. The polymer includes a monomer having a sulfonic acid group, an alkoxy functional group and a hydroxy functional group. The polymer is chemically grafted on to the colorant by electron donation/acceptation and hydrogen bonded with the surface functional groups. The sulfonic acid, alkoxy and hydroxy groups of the polymer help to increase the solubility of the polymer in the ink formulation. The ink formulation further includes a surfactant, a humectant and a biocide. The polymer associated surface modified colorants provide improved resistance to perpendicular or parallel abrasion of the ink on the paper, improved adhesion of the ink to the paper, improved gloss, and a decrease in star wheel defects specifically found on microporous photo papers without affecting the optical density and ink reliability.

In various embodiments of the invention, the at least one colorant is a self-dispersed colorant. The colorant is added at 1 to 10 weight percent and preferably 4 weight percent of the entire formulation. The balance of the formulation is given below with the remainder being made up of water. The colorant is surface modified to create functional groups on the surface of colorant particles. The colorant surface may be modified by oxidation method or other surface modification methods known in the art. The surface modification helps in making the colorant self-dispersant in aqueous medium. The colorant may be an organic or an inorganic pigment. Common organic pigments that may be used include copper phthalocyane, quinacridone, azo and non-azo pigment and other pigments with the desired hue for ink jet printing. Examples of commercially available organic pigments may include commercial pigments from Cabot Corporation such as Cab-O-Jet 260 (magenta), and 270 (yellow). Commonly used inorganic pigment includes carbon black. A particularly preferred carbon black for making oxidized carbon black is neutral carbon black available from Cabot Corporation under the trade name MONARCH 880. The carbon black is surface modified by direct oxidation to create functional groups such as carboxy, hydroxy functional groups, sulfonic functional groups, and the like. These surface functional groups provide sites for reaction.

The polymer having an alkyl amino (—RNH2) end functional group interacts with the surface functional groups of the colorant to generate polymer associated surface modified colorants. The alkyl amino end functional group is associated to the surface functional groups by hydrogen bonding or by salt formation. Further, the monomer in the polymer is selected such that the monomers, except the amino end functional group, do not have strong interaction with the colorant particles. Further, the polymer has good solubility in the ink solvents.

In an embodiment of the invention, the polymer is an acrylate polymer having an acrylic monomer. The acrylic monomer may for example be ethoxyethyl methacrylate, hydroxyethyl methacrylate, styrenesulfonic acid, or a mixture thereof. The weight average molecular weight of the acrylate polymer is in the range of about 500 to about 8000. More preferably, it is the range of about 1000 to about 2000. The acrylate polymer is added from 0.5 to 5 weight percent of the entire formulation and preferably at 1 weight percent of the entire formulation.

In addition biocides, such as Kordek MLX sold commercially by Rohm and Haas, may be added to the ink formulation to inhibit growth of microorganisms. The biocide is added at 0.01 to 0.5 weight percent and preferably at 0.07 weight percent of the entire formulation to be effective in inhibiting the gram positive and negative bacteria as well as mold growth. Further, a surfactant may be added in the ink formulation to reduce the surface tension. In an embodiment of the invention, the surfactant is a nonionic non-amphoteric surfactant such as Surfynol 465. The surfactant is added at 0.2 to 1.5 weight percent and preferably at 0.7 weight percent of the entire formulation. Furthermore, a humectant such as polyethylene glycol 200 (PEG 200) may be also be added to prevent premature drying of the ink and build up of solids around the printhead nozzle. The humectant is added at 5 to 30 weight percent and preferably at 20 weight percent of the entire formulation. In addition, some of the organic solvents that may be used in the ink formulation may include, but are not limited to, ethanol, isopropyl alcohol, butyanol, ethylene glycol, propylene glycol, 1,3-propanediol, 1,2-propanediol, 1,4-butanediol, 1,2-butanediol 1,5-pentanediol, 1,6-hexanediol, 1,2,6-hexanetriol, glycerol, 1,2-hexanediol, diethylene glycol, glycerol, triethylene glycol, ethylene glycol monomethyl ether, ethylene glycol monoethyl ether, acetone, diacetone alcohol, dimethylformamide, dimethylacetamide, N-methylpyrrolidone, and 2-pyrrolidone.

The following examples are provided for illustrating the synthesis of the polymer associated surface modified colorants and do not limit the scope of the invention:

EXAMPLE 1

The synthesis of the polymer associated surface modified colorant involves synthesis of the acrylate polymer with the alkyl amino end functional group —RNH2 and then, reacting the acrylate polymer with the self-dispersed colorant particles having surface functional groups.

4.12 gram (0.02 mole) of sodium salt of styrenesulfonic acid, 0.96 gram (0.008 mole) of cysteamine hydrochloride, and 0.2 gram of azo initiators such as V-50 from Wako Co., were dissolved in 50 gram of deionized water in a beaker. In another beaker, 12.6 gram (0.08 mol) of ethoxyethyl methacrylate and 13.2 gram (0.1 mol) of hydroxyethyl methacrylate were dissolved in 40 milliliter of ethanol. The solutions were then mixed in a three neck flask. The three neck flask was equipped with a condenser, a thermometer and a mechanical stirrer and was vacuum pumped and back filled with nitrogen by repeated partial evacuation followed by backfill using a firestone valve. The three neck flask was immersed in an oil bath and heated to about 68° C. with magnetic stirring for about 18 hours. The resulting product was poured in a one neck flask and 200 gram of deionized water is added to it. Thereafter, ethanol was removed from the manufactured acrylate polymer by rota-vap.

The synthesized acrylate polymer was then reacted with SBP0112 self-dispersed carbon black and sonicated for about 30 minutes to form surface modified pigment according to the invention. The pigment to polymer ratio employed was 10 to 3.

EXAMPLE 2

6.18 gram (0.03 mole) of sodium salt of styrenesulfonic acid, 0.96 gram (0.008 mole) of cysteamine hydrochloride, and 0.2 gram of azo initiators such as V-50 from Wako Co. were dissolved in 50 gram of deionized water in a beaker. In another beaker, 18.9 gram (0.12 mol) of ethoxyethyl methacrylate were dissolved in 40 milliliter of ethanol. The solutions were then mixed in a three neck flask. The three neck flask was equipped with a condenser, a thermometer and a mechanical stirrer and was vacuum pumped and back filled with nitrogen by repeated partial evacuation followed by backfill using a firestone valve. The three neck flask was immersed in an oil bath and heated to about 68° C. with magnetic stirring for about 18 hours. The resulting product is poured in a one neck flask and 200 gram of deionized water is added to it. Thereafter, ethanol was removed from the manufactured acrylate polymer by rota-vap. The acrylate polymer includes the alkyl amino end functional group —RNH2.

The above synthesized acrylate polymer was then reacted with SBP0112 self-dispersed carbon black and sonicated for about 30 minutes to form the surface modified pigment according to invention. The pigment to polymer ratio employed was 10 to 3.

EXAMPLE 3

6.18 gram (0.03 mole) of sodium salt of styrenesulfonic acid, 0.96 gram (0.008 mole) of cystamine hydrochloride, and 0.2 gram of azo initiators such as V-50 from Wako Co. were dissolved in 50 gram of deionized water in a beaker. In another beaker, 26.8 gram (0.18 mol) of ethoxyethyl methacrylate and 8 gram (0.06 mol) of hydroxyethyl methacrylate were dissolved in 40 milliliter of ethanol. The solutions were then mixed in a three neck flask. The three neck flask was equipped with a condenser, a thermometer and a mechanical stirrer and was vacuum pumped and back filled with nitrogen by repeated partial evacuation followed by backfill using a firestone valve. The three neck flask was immersed in an oil bath and heated to about 68° C. with magnetic stirring for about 18 hours. The resulting product is poured in a one neck flask and 200 gram of deionized water is added to it. Thereafter, ethanol was removed from the manufactured acrylate polymer by rota-vap. The acrylate polymer includes the alkyl amino end functional group —RNH2.

The above synthesized acrylate polymer was then reacted with SBP0112 self-dispersed carbon black and sonicated for about 30 minutes to form surface modified pigment according to the invention. The pigment to polymer ratio employed was 10 to 3.

The following table 1 provides ink formulations with self-dispersed carbon black and polymer associated self-dispersed carbon black of example 1, example 2 and example 3 in accordance with various embodiments of the invention:

TABLE 1

Ink Formulations

| Content | Ink Formulation—Self-dispersed carbon black (in gm) | Ink Formulation—Example 1 (in gm) | Ink Formulation—Example 2 (in gm) | Ink Formulation—Example 3 (in gm) |
|---|---|---|---|---|
| DI water | 55.00 | 50.24 | 47.00 | 47.50 |
| Tri (Ethylene Glycol) | 12 | 12 | 12 | 12 |
| Glycerol | 6 | 6 | 6 | 6 |
| PEG 200 | 2.5 | 2.5 | 2.5 | 2.5 |
| Surfynol 465 | 0.7 | 0.7 | 0.7 | 0.7 |
| Kordek MLX | 0.15 | 0.15 | 0.15 | 0.15 |
| SBP 0112 (aqueous) | 23.65 | | | |
| Example 1 (CB—2.5% wt of self-dispersed CB) | | 28.41 | | |
| Example 2 (CB—2.5% wt of self-dispersed CB) | | | 31.65 | |
| Example 3 (CB—2.5% wt of self-dispersed CB) | | | | 31.15 |

The printing quality of ink formulations of polymer associated self-dispersed carbon black of example 1, example 2 and example 3 was compared with ink formulations of self-dispersed carbon black and Lexmark commercial inkjet cartridge 41, 41A, 43XL, or 45. The ink formulation was tested for resistance to abrasion and, gloss.

Table 2 compares resistance to abrasion from forces applied laterally to the ink on the paper for polymer-associated self-dispersed carbon black of example 1, example 2 and example 3 with ink formulations of self-dispersed carbon black and Lexmark cartridge 43XL. The lateral abrasion test or smear test is designed to test the resistance of inkjet photos to handling defects when a consumer touches or smears a photo at various time intervals after printing The ink formulations of polymer-associated self-dispersed carbon black of example 1, example 2 and example 3 were used to print a smear test file on Lexmark PerfectFinish™ paper in a controlled temperature and humidity environment of: 23° C./50% relative humidity. The smear test file is a series of rows of 12 blocks, each block being 1 cm square primary, secondary or tertiary color at 100% and 50% density, printed on an 8½ by 11 inch piece of photo inkjet paper. There are unprinted white areas exposed from the photo paper on the top and bottom of the rows of 12 blocks. The printed smear test output is placed on top of a flat hard horizontal surface. A minimum of 400 g of force wrapped in a tissue paper is applied on each of the 12 blocks individually and then the force is drug over each block individually at 5 cm per second according to predetermined time intervals. The recommended tissue paper is KIMTECH Science Kimwipes "Delicate Task Wipers" which are 4.4×8.4 inches in size. In this case, the smear test was conducted 5 minutes and 24 hours after printing.

Smear is evaluated by a subjective visual assessment of the color density of each of the 12-block set, and of the amount of colorant transferred outside each of the blocks, at each time increment, on a scale of 0 to 5, with 0 being the best and 5 being the worst. Since the evaluation is visual, the accuracy is limited by the ability of the evaluator to utilize a consistent definition of the scale across multiple time increments and test samples. For example, a rating of 0 for the best smear would be no visible traces of colorant on the white areas outside of the any of 12 blocks and no reduction in density of the any of the 12 blocks, i.e., strong adhesion of the ink to the paper. The rating increases as the amount of colorant is removed from the 12 blocks and transferred to the white area outside the blocks. A rating of 5 is given to the worst type of smear where the colorant has been removed from the 12 blocks to reveal the white paper underneath, i.e. a lack of adhesion of the ink to the paper.

In cases where severe smear occurs on fewer than 5 blocks, the evaluator must determine whether the severe smear on at least 1 of the blocks is worse than 2 blocks having moderate smear. If so, the smear should be assessed at the next higher numerical rating than would be given if all blocks have moderate smear. The smear scale for a particular rating is considered the minimum allowable degree of smear for that rating. In other words, if the degree of smear of a 12-block set on a test sample falls in between 2 ratings then the 12-block set should be assessed at the lower numerical rating. When evaluating smear, the 12-block set at each time increment is evaluated independently. Individual blocks within a 12-block set for a single time increment are evaluated as a whole.

TABLE 2

Smear Results

| | Ink Formulation—Self-dispersed carbon black | Ink Formulation—Example 1 | Ink Formulation—Example 2 | Ink Formulation—Example 3 | Lexmark cartridge 43XL |
|---|---|---|---|---|---|
| 5 Minutes | 5 | 1 | 1 | 1 | 5 |
| 24 Hours | 5 | 1 | 1 | 1 | 5 |

Ranking: 1 Best, 5 Worst

The results of smear test indicate that the ink formulations of polymer associated self-dispersed carbon black have improved smear or resistance to parallel abrasion of the ink on the paper indicating improved adhesion on Lexmark PerfectFinish™ paper.

Table 3 compares gloss characteristics of ink formulations of polymer-associated self-dispersed carbon black of example 1, example 2 and example 3 with ink formulations of self-dispersed carbon black and Lexmark cartridge 43XL. The ink formulations of polymer-associated self-dispersed carbon black of example 1, example 2 and example 3 were used to print a gray scale file having black blocks with increasing gray scale density fill from 20%, 40%, 60%, 80%, to 100%. The gray scale file was printed in a controlled temperature and humidity environment of: 23° C./50% and relative humidity on Lexmark PerfectFinish™. Gloss was measured after 24 hours of drying. Table 3 depicts 60° gloss results as measured by Micro-TRI-gloss, supplied by BYK Gardner. The higher the number from this test, the glossier the surface is. The typical standards for gloss measurements are ASTM D 2457, DIN EN ISO 2813 and DIN 67530.

PerfectFinish™ paper using linear color table in a controlled temperature and humidity environment of 23° C./50% relative humidity. The starwheels test file is a gray scale file of with gray scale 20%, 40%, 60%, 80%, and 100% contiguous black ink blocks 2 inches by 7 inches wide.

Susceptibility to starwheels defects is evaluated by a subjective visual assessment of the visibility of point defects and loss of density of each of the grayscale blocks on a scale of 0 to 5, with 0 being the best and 5 being the worst. A point defect is defined as being able to visually see the white of the paper inside one of the grayscale blocks. Since the evaluation is visual, the accuracy is limited by the ability of the evaluator to utilize a consistent definition of the scale across multiple test samples. For example, a rating of 0 for the best starwheels would be no reduction in density or visible point defects in

TABLE 3

Gloss Results

| Gray Scale (%) | Ink Formulation—Self-dispersed carbon black | Ink Formulation—Example 1 | Ink Formulation—Example 2 | Ink Formulation—Example 3 | Lexmark cartridge 43XL |
|---|---|---|---|---|---|
| 20 | 53 | 57 | 57 | 57 | 74 |
| 40 | 32 | 53 | 54 | 48 | 72 |
| 60 | 27 | 57 | 58 | 51 | 72 |
| 80 | 29 | 61 | 56 | 49 | 75 |
| 100 | 44 | 92 | 56 | 43 | 85 |

The results of gloss test indicate that the ink formulations of polymer associated self-dispersed carbon black have higher gloss numbers and hence improved gloss compared to self-dispersed carbon black on Lexmark PerfectFinish™ paper.

Table 4 compares the resistance to perpendicular abrasion of ink formulations on the photo paper of polymer-associated self-dispersed carbon black of example 1, example 2 and example 3 with ink formulations of self-dispersed carbon black and Lexmark cartridge 43XL. This perpendicular abrasion test simulates the effect of the paper drive mechanisms or starwheels within the printer that contact the ink on the paper perpendicularly to the paper surface and hereafter is termed a starwheel test. The ink formulations of polymer-associated self-dispersed carbon black of example 1, example 2 and example 3 were used to print a starwheels test file on Lexmark any of the grayscale blocks, i.e., strong adhesion of the ink to the paper. The rating increases as the number of point defects increase in the grayscale blocks and as the density of the blocks decreases. A rating of 5 is given to the worst type of starwheels defects where multiple point defects can be clearly seen resulting in an overall reduction in density in all of the grayscale patches, i.e. a lack of adhesion of the ink to the paper.

TABLE 4

Star Wheel Results

| Gray Scale (%) | Ink Formulation—Self-dispersed carbon black | Ink Formulation—Example 1 | Ink Formulation—Example 2 | Ink Formulation—Example 3 | Lexmark cartridge 43XL |
|---|---|---|---|---|---|
| 20 | 1 | 1 | 1 | 1 | 1 |
| 40 | 1 | 1 | 1 | 1 | 5 |
| 60 | 2 | 1 | 2 | 1 | 5 |
| 80 | 2 | 4 | 2 | 1 | 5 |
| 100 | 4 | 5 | 5 | 2 | 5 |

The results of star wheel testing indicates that the ink formulations of polymer associated self-dispersed carbon black have improved resistance to perpendicular abrasion by drive mechanisms such as starwheel compared to compared to self-dispersed black or Lexmark cartridge 43XL ink on Lexmark PerfectFinish™ Paper.

The ink formulation of the invention has advantages of both self-dispersed carbon black and dispersed carbon black. The ink formulation shows excellent adhesion and improved gloss and optical density on print media especially on microporous photo papers. Further, the ink formulation of the invention shows better resistance to parallel or perpendicular abrasion forces than to self-dispersed carbon black or Lexmark cartridge 43XL.

The foregoing description of an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An ink formulation comprising:
   a surface modified colorant chemically grafted with a polymer, the surface modified colorant having surface functional groups, and the polymer having an alkyl amino end functional group and a monomer having a sulfonic acid group, an alkoxy functional group and a hydroxy functional group,
   wherein the alkyl amino end functional group of the polymer reacts with the surface functional groups of the surface modified colorant, and
   wherein the ink formulation provides improved adhesion of the ink to a paper, improved resistance to abrasive forces and improved gloss and improved optical density over a self dispersed colorant formulations.

2. The ink formulation according to claim 1, wherein the polymer is an acrylate polymer prepared from an alkyl amino compound and a mixture of acrylic monomers.

3. The ink formulation according to claim 2, wherein the mixture of acrylic monomers includes ethoxyethyl methacrylate, hydroxyethyl methacrylate, and styrenesulfonic acid.

4. The ink formulation according to claim 2, wherein the weight average molecular weight of the acrylate polymer is from about 500 to about 8000.

5. The ink formulation according to claim 2, wherein the alkyl amino compound includes cysteamine hydrochloride.

6. The ink formulation according to claim 1, wherein the surface modified colorant comprises an organic pigment.

7. The ink formulation according to claim 1, wherein the surface modified colorant comprises an inorganic pigment.

8. The ink formulation according to claim 7, wherein the inorganic pigment is carbon black.

9. The ink formulation according to claim 1, wherein the surface functional groups of the surface modified colorant are carboxy functional groups.

10. The ink formulation according to claim 1, wherein the surface functional groups of the surface modified colorant are hydroxy functional groups.

11. The ink formulation according to claim 1, wherein the alkyl amino end functional group of the polymer reacts with the surface functional groups of the surface modified colorant by hydrogen bonding.

12. The ink formulation according to claim 1, wherein the alkyl amino end functional group of the polymer reacts with the surface functional groups of the surface modified colorant by salt formation reaction.

13. The ink formulation according to claim 1, wherein a weight ratio of the surface modified colorant to the polymer is about 10 to 3.

14. The ink formulation according to claim 1, wherein the ink formulation is an aqueous formulation.

15. The ink formulation according to claim 1 further comprising a biocide.

16. The ink formulation according to claim 1 further comprising a surfactant.

17. The ink formulation according to claim 1 further comprising a humectant.

18. An ink formulation suitable for use in inkjet printing comprising:
   a surface modified carbon black chemically grafted with a polymer, the surface modified carbon black having surface functional groups, and the polymer having an alkyl amino end functional group and a monomer having a sulfonic acid group, an alkoxy functional group and a hydroxy functional group,
   wherein the alkyl amino end functional group of the polymer reacts with the surface functional groups of the surface modified carbon black, and
   wherein the ink formulation provides improved adhesion of the ink to a paper, improved resistance to abrasive forces and improved gloss and improved optical density over a self dispersed colorant formulations.

* * * * *